(12) United States Patent
Kusano et al.

(10) Patent No.: US 7,307,935 B2
(45) Date of Patent: Dec. 11, 2007

(54) RECORDING AND PLAYBACK APPARATUS, MUSIC-DATA RECORDING AND PLAYBACK METHOD, AND MUSIC-DATA RECORDING AND PLAYBACK PROGRAM

(75) Inventors: Manabu Kusano, Iwaki (JP); Masatoshi Ejiri, Iwaki (JP); Shinji Wakabayashi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 507 days.

(21) Appl. No.: 10/930,681

(22) Filed: Aug. 31, 2004

(65) Prior Publication Data

US 2005/0088933 A1    Apr. 28, 2005

(30) Foreign Application Priority Data

Sep. 4, 2003   (JP)   ............... 2003-312788

(51) Int. Cl.
   *G11B 27/36*   (2006.01)
(52) U.S. Cl. ............... 369/53.31; 369/30.24; 369/47.15; 369/84; 711/162
(58) Field of Classification Search ........... 369/53.31, 369/53.35, 47.15, 47.22, 84; 711/162, 111, 711/156
   See application file for complete search history.

(56) References Cited

U.S. PATENT DOCUMENTS

| 4,796,098 | A | * | 1/1989 | Giddings | ............. | 369/53.29 |
| 5,267,048 | A | * | 11/1993 | Hirai | ............. | 358/404 |
| 6,437,228 | B2 | | 8/2002 | Tanji | | |
| 6,647,201 | B2 | | 11/2003 | Yoshimura et al. | | |
| 6,763,429 | B1 | * | 7/2004 | Hirayama | ............. | 711/112 |
| 6,886,075 | B2 | * | 4/2005 | Yagisawa et al. | ............. | 711/114 |
| 7,013,371 | B2 | * | 3/2006 | Watanabe et al. | ............. | 711/161 |
| 7,023,781 | B2 | * | 4/2006 | Tsuji | ............. | 369/53.31 |
| 7,068,575 | B2 | * | 6/2006 | Gabryjelski | ............. | 369/47.33 |
| 7,151,732 | B2 | * | 12/2006 | Tsuji | ............. | 369/53.31 |
| 7,167,961 | B2 | * | 1/2007 | Yeo | ............. | 711/162 |
| 2002/0101772 | A1 | | 8/2002 | Denda et al. | | |
| 2004/0013058 | A1 | | 1/2004 | Kudo | | |
| 2005/0041551 | A1 | * | 2/2005 | Hyen | ............. | 369/53.31 |

FOREIGN PATENT DOCUMENTS

| JP | 62166451 A | * | 7/1987 |
| JP | 11-288547 | | 10/1999 |
| JP | 2002-230893 | | 8/2002 |
| JP | 2002-245716 | | 8/2002 |

* cited by examiner

*Primary Examiner*—Thang V. Tran
(74) *Attorney, Agent, or Firm*—Brinks Hofer Gilson & Lione

(57) ABSTRACT

A recording and playback apparatus according to the present invention includes a duplicating section for duplicating music data from a music CD in a CD read-out section onto a hard disk and a preserving section which, if duplication by the duplicating section is interrupted, preserves TOC information identifying the music CD and duplicated-music-data information identifying duplicated music data such that the TOC information is associated with the duplicated-music-data information. The recording and playback apparatus further includes a playback section for playing back music data stored in the hard disk. When a music CD having a history of interrupted duplication is placed in the CD read-out section, the duplicating section resumes duplication onto the hard disk based on the TOC information and the duplicated-music-data information preserved in the preserving section.

13 Claims, 5 Drawing Sheets

INFO ON
INTERRUPT
POINT

FIG. 3

TOC INFORMATION

| ID NO. | NO. OF TRACKS | TOTAL PLAY TIME | TRACK NO. | PLAY TIME | COPYING DONE OR NOT DONE | INFO ON PLAYBACK-INTERRUPT POINT |
|---|---|---|---|---|---|---|
| 01 | 8 | 23 min 15 sec | 01 | 3 min 30 sec | DONE | — |
| | | | 02 | 4 min 00 sec | DONE | — |
| | | | 03 | 3 min 15 sec | NOT DONE | 1 min 15 sec |
| | | | 04 | 4 min 45 sec | NOT DONE | — |
| | | | 05 | 3 min 30 sec | NOT DONE | — |
| | | | 06 | 4 min 15 sec | NOT DONE | — |
| | | | 07 | 4 min 00 sec | NOT DONE | — |
| | | | 08 | 4 min 30 sec | NOT DONE | — |
| ... | ... | ... | ... | ... | ... | ... |

RECORDING AND PLAYBACK APPARATUS, MUSIC-DATA RECORDING AND PLAYBACK METHOD, AND MUSIC-DATA RECORDING AND PLAYBACK PROGRAM

BACKGROUND OF THE INVENTION

1. Field of the Invention

The present invention relates to a recording and playback apparatus, a music-data recording and playback method, and a music-data recording and playback program.

2. Description of the Related Art

Products called music servers, which record as compressed data the music data from a music compact disk (CD) onto, for example, a hard disk while simultaneously playing back the music data, are well known. These products record music data from a music CD in the CD drive onto a hard disk, for as many tracks as specified, such as a single track, several tracks, or all tracks.

Some of these products play back music data from a music CD at the standard rate, while simultaneously recording music data from the same CD onto a hard disk at a higher rate, for example, at a rate eight times the standard rate. In this case, since the playback rate differs from the recording rate, if the power is turned OFF or the music CD, say an album, is ejected while two or more tracks on the CD are being sequentially played back and recorded, it is not possible to determine the last track recorded.

For this reason, when the user inserts into the CD drive a music CD having a history of interrupted recording before completion to resume recording from the track subsequent to the last recorded track, the user needs to perform a time-consuming operation of visually checking the tracks already recorded with reference to, for example, a playlist of the recorded tracks before specifying tracks that have not yet been recorded.

To overcome this problem, a known playback apparatus enables the user to understand up to which track recording is completed by synchronizing playback with recording. More specifically, in this known playback apparatus, when the recording of, for example, the second track is started, playback of the second track is also started at the same time, even if the playback of the first track has not yet been completed.

Japanese Unexamined Patent Application Publication No. 11-288547 proposes another known playback apparatus. In the playback apparatus described in this Patent Application Publication, if recording is interrupted prematurely, CD playback resumes from the recording-interrupt point, while recording onto a mini disk (MD) is resumed from the last recording point.

In this known playback apparatus, however, the user may feel annoyed because playback of a track is interrupted before completion, although the user can know up to which track recording is completed. Another problem with this known playback apparatus is that when recording of a music CD is to be started from the last recording point long after the recording of the music CD has been interrupted, the user forgets the last track recorded, similarly forcing the user to perform a time-consuming operation of, for example, checking a playlist.

SUMMARY OF THE INVENTION

In order to overcome these problems, an object of the present invention is to provide a recording and playback apparatus, a music-data recording and playback method, and a music-data recording and playback program that, even if duplication is interrupted prematurely, enable the subsequent duplication to be resumed in a simple manner.

According to a first aspect of the present invention, a recording and playback apparatus includes a duplicating section for duplicating music data from a recording medium in a predetermined read-out section onto a predetermined storage section; a preserving section which, if duplication by the duplicating section is interrupted, preserves identification information identifying the recording medium and duplicated-music-data information identifying duplicated music data such that the identification information is associated with the duplicated-music-data information; and a playback section for playing back music data stored in the storage section. When a recording medium having a history of interrupted duplication is placed in the read-out section, the duplicating section resumes duplication onto the storage section based on the identification information and the duplicated-music-data information preserved in the preserving section.

Thus, even if duplication is interrupted prematurely, duplication can be resumed from the interrupted point. This simplifies the operation of specifying music data that have not yet been duplicated. In short, a duplication operation can easily be carried out.

The recording and playback apparatus may further include a dialog display section for displaying dialog which enables a user to select whether or not duplication onto the storage section is to be resumed when a recording medium having a history of interrupted duplication is placed in the read-out section.

Thus, the user can select whether or not duplication is to be resumed from the music number subsequent to the previously duplicated music number.

In the recording and playback apparatus, the playback section may resume playback of music data from interrupted music if the duplicating section has resumed duplication within a predetermined period of time, or from the first piece of music if the duplicating section has resumed duplication after a predetermined period of time, or if the recording medium in the read-out section has ever been ejected and has been placed again in the read-out section.

Thus, a user can play back music data from the interrupted music if duplication is resumed by the duplicating section within a predetermined period of time after duplication has been interrupted.

According to a second aspect of the present invention, a recording and playback apparatus includes a duplicating section for duplicating music data from a recording medium in a predetermined read-out section onto a predetermined storage section; a playback section for playing back music data recorded on the recording medium; and a preserving section which, when playback by the playback section is interrupted as a result of a source being switched, preserves playback-interrupt-point information identifying a point at which the playback is interrupted. The duplicating section continues duplication onto the storage section even though playback is interrupted as a result of the source being switched. When an instruction is given that music data on the recording medium in the read-out section should be played back as a result of a source being switched, the playback section resumes playback of music data on the recording medium based on the playback-interrupt-point information preserved in the preserving section.

With the recording and playback apparatus, a different source can be selected while duplication onto the storage section is in progress.

According to a third aspect of the present invention, a music-data recording and playback method includes a duplicating act of duplicating music data from a recording medium in a predetermined read-out section onto a predetermined storage section; a preserving act of enabling a preserving section to preserve identification information identifying the recording medium and duplicated-music-data information identifying duplicated music data such that the identification information is associated with the duplicated-music-data information, when duplication in the duplicating act is interrupted; and a playback act of playing back music data stored in the storage section. In the duplicating act, when a recording medium having a history of interrupted duplication is placed in the read-out section, duplication onto the storage section is resumed based on the identification information and the duplicated-music-data information preserved in the preserving section.

Thus, even if duplication is interrupted prematurely, duplication can be resumed from the interrupted point. This simplifies the operation of specifying music data that have not yet been duplicated.

The music-data recording and playback method may further include a dialog display act of displaying dialog which enables a user to select whether or not duplication onto the storage section is to be resumed when a recording medium having a history of interrupted duplication is placed in the read-out section.

Thus, the user can select whether or not duplication is to be resumed from the music number subsequent to the previously duplicated music number.

In the playback act of the music-data recording and playback method, playback of music data may be resumed from interrupted music if duplication is resumed in the duplicating act within a predetermined period of time, or from the first piece of music if duplication is resumed in the duplicating act after a predetermined period of time or if the recording medium in the read-out section has ever been ejected and has been placed again in the read-out section.

Thus, natural playback operation as assumed by the user is ensured.

According to a fourth aspect of the present invention, a music-data recording and playback method includes a duplicating act of duplicating music data from a recording medium in a predetermined read-out section onto a predetermined storage section; a playback act of playing back music data recorded on the recording medium; and a preserving act of enabling a preserving section to preserve playback-interrupt-point information identifying a point at which playback is interrupted, when playback in the playback act is interrupted as a result of a source being switched. In the duplicating act, duplication onto the storage section is continued even though playback is interrupted as a result of the source being switched. In the playback act, when an instruction is given that music data on the recording medium in the read-out section should be played back as a result of a source being switched, playback of music data on the recording medium is resumed based on the playback-interrupt-point information preserved in the preserving section.

With the music-data recording and playback method, a different source can be selected while duplication onto the storage section is in progress.

According to a fifth aspect of the present invention, a music-data recording and playback program enables a computer to function as a duplicating device for duplicating music data from a recording medium in a predetermined read-out device onto a predetermined storage device; a device for enabling a preserving device to preserve identification information identifying the recording medium and duplicated-music-data information identifying duplicated music data such that the identification information is associated with the duplicated-music-data information, when duplication by the duplicating device is interrupted; a playback device for playing back music data stored in the storage device; and a duplication-resuming device for resuming duplication onto the storage device based on the identification information and the duplicated-music-data information preserved in the preserving device, when a recording medium having a history of interrupted duplication is placed in the read-out device.

Thus, even if duplication is interrupted prematurely, duplication can be resumed from the interrupted point. This simplifies the operation of specifying music data that have not yet been duplicated.

The music-data recording and playback program may further include a dialog display device for displaying dialog which enables a user to select whether or not duplication onto the storage device is to be resumed when a recording medium having a history of interrupted duplication is placed in the read-out device.

Thus, the user can select whether or not duplication is to be resumed from the music number subsequent to the previously duplicated music number.

In the music-data recording and playback program, the playback device may resume playback of music data from interrupted music if the duplication-resuming device has resumed duplication within a predetermined period of time, or from the first piece of music if the duplication-resuming device has resumed duplication after a predetermined period of time or if the recording medium in the read-out device has ever been ejected and has been placed again in the read-out device.

Thus, natural playback operation as assumed by the user is ensured.

According to a sixth aspect of the present invention, a music-data recording and playback program enables a computer to function as a duplicating device for duplicating music data from a recording medium in a predetermined read-out device onto a predetermined storage device; a playback device for playing back music data recorded on the recording medium; a device for enabling a preserving device to preserve playback-interrupt-point information identifying a point at which playback is interrupted, when playback by the playback device is interrupted as a result of a source being switched; and a device for continuing duplication onto the storage device even though playback is interrupted as a result of the source being switched and for resuming playback of music data on the recording medium based on the playback-interrupt-point information preserved in the preserving device, when an instruction is given that music data on the recording medium in the read-out device should be played back as a result of a source being switched.

With the music-data recording and playback program, a different source can be selected while duplication onto the storage device is in progress.

As described above, the present invention can provide a recording and playback apparatus, a music-data recording and playback method, and a music-data recording and playback program that, even if duplication is interrupted prematurely, enable the subsequent duplication to be resumed in a simple manner.

BRIEF DESCRIPTION OF THE DRAWINGS

FIG. 3 is a diagram illustrating a table where TOC information is associated with a recorded track number and information about a playback-interrupt point;

DETAILED DESCRIPTION OF THE PREFERRED EMBODIMENTS

A preferred embodiment according to the present invention will now be described.

Figure 1:
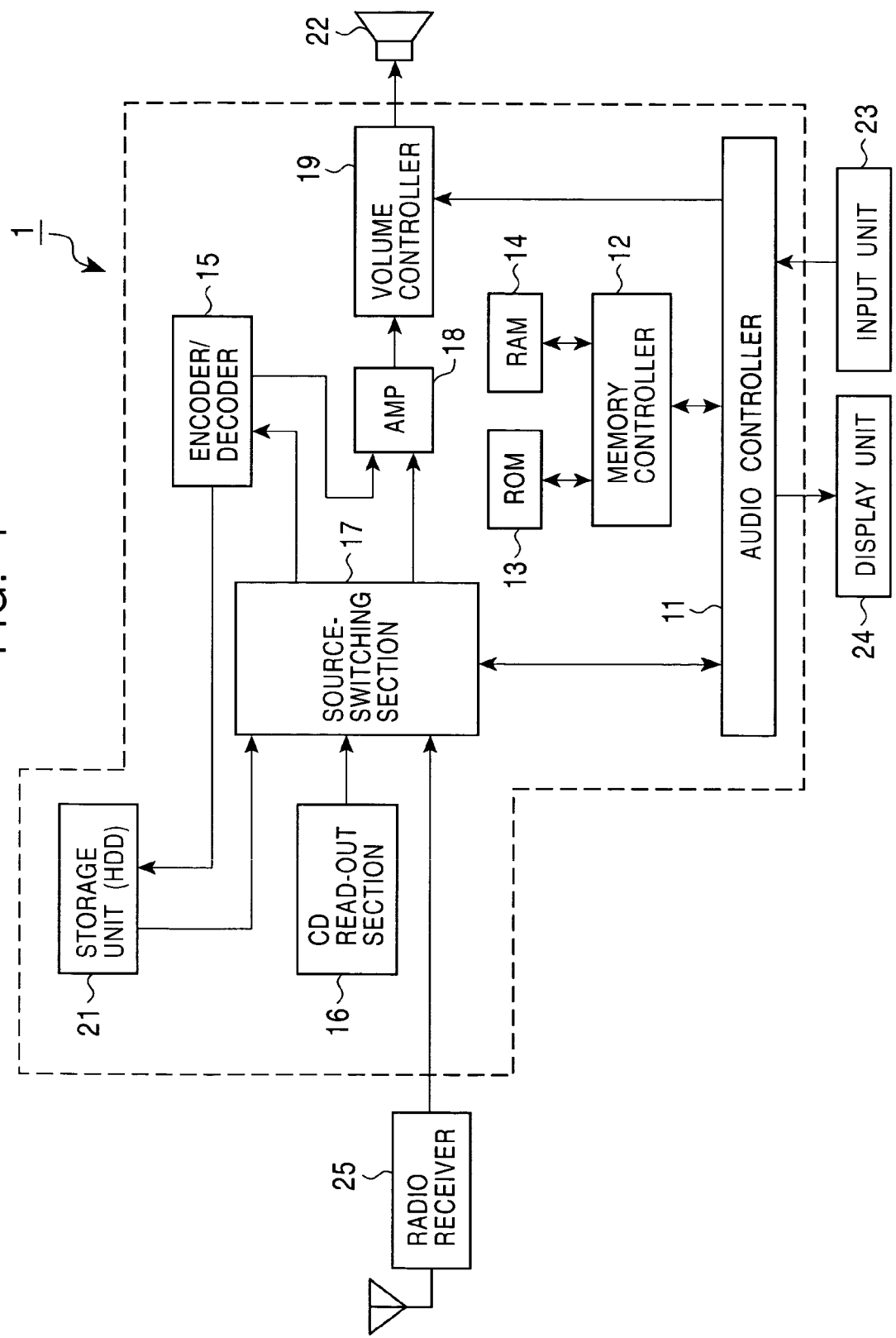
FIG. 1 is a block diagram showing the structure of a recording and playback apparatus according to an embodiment of the present invention.

FIG. 1 is a block diagram showing the structure of a recording and playback apparatus 1 according to the embodiment. The recording and playback apparatus 1 includes an audio controller 11, a memory controller 12, a read only memory (ROM) 13, a random access memory (RAM) 14, an encoder/decoder 15, a CD read-out section 16, a source-switching section 17, an amplifier 18, and a volume controller 19.

The source-switching section 17 switches the current source of sound-output content to another source from among the connected information sources. As shown in FIG. 1, the source-switching section 17 has, for example, a radio receiver 25, the CD read-out section 16 (e.g., a music CD or CD-ROM, which is hereinafter referred to as a CD medium), and a storage unit (HDD) 21 connected to it.

When the user selects the playback function for playing back the CD medium, the audio controller 11 loads a predetermined program with various types of information (a program for achieving the operation described below and various associated types of information) from the ROM 13 or RAM 14 via the memory controller 12 and executes the program. In other words, the CD read-out section 16 is set as the information source in the source-switching section 17, and thereby the music data is input to the volume controller 19 via the amplifier 18.

The audio controller 11 controls the volume controller 19 according to the sound volume set by the user. The volume controller 19 generates an analog signal with an amplitude in accordance with this control, and provides this analog signal to the speaker 22 to output playback sound.

With the structure described above, when duplication of music data stored on the CD medium is requested, the audio controller 11 controls the source-switching section 17 to switch the output destination of music data read out by the CD read-out section 16 to the encoder/decoder 15.

The encoder/decoder 15 encodes the input music data according to a predetermined compression encoding scheme, such as the MP3 format or the ATRAC3 format, and stores this encoded music data in the storage unit 21, realized by a hard disk drive (HDD).

Furthermore, when music data recorded in the HDD 21 is to be played back, the audio controller 11 controls the source-switching section 17 to set the HDD 21 as the information source and the encoder/decoder 15 as the output destination. Music data decoded by the encoder/decoder 15 is then output as an analog signal from the speaker 22 via the amplifier 18 and the volume controller 19.

Functions of the audio controller 11 will now be described in detail. According to a predetermined program, the audio controller 11 functions as a duplicating means for duplicating music data stored on the music CD (recording medium) placed in the CD read-out section 16 (read-out means) onto the HDD 21 (storage means); a means for enabling the HDD 21 (preserving means) to preserve the TOC information (identification information) that identifies the music CD (recording medium) and the associated information about duplicated tracks that identifies the duplicated tracks if duplication by the duplicating means is interrupted; and a playback means for playing back music data stored in the HDD 21 (storage means).

In addition, when a duplication-interrupted music CD is placed in the CD read-out section 16, the audio controller 11 resumes duplication onto the HDD 21 based on the TOC information and the information about duplicated tracks preserved in, for example, the HDD 21 according to a predetermined program.

When a duplication-interrupted music CD is placed in the CD read-out section 16, the audio controller 11 also functions as dialog display means for prompting the user to select whether duplication onto the HDD 21 should be resumed, according to a predetermined program.

Furthermore, the audio controller 11, according to a predetermined program, functions as a means for resuming playback of music data from the interrupted track when duplication by the duplicating means is resumed within a predetermined period of time, or for starting playback of music data from the first track if duplication by the duplicating means is resumed after a predetermined period of time or after the music CD placed in the CD read-out section 16 has been ejected and again placed in the CD read-out section 16.

Furthermore, according to a predetermined program, the audio controller 11 functions as a duplicating means for duplicating music data from the music CD in the CD read-out section 16 onto the HDD 21; a playback means for playing back music data recorded on the music CD; a means for enabling the preserving means to preserve information about the playback-interrupt point that identifies the playback-interrupt point when playback by the playback means is interrupted as a result of the source being switched; and a means for continuing duplication onto the HDD 21 despite playback being interrupted as a result of the source being switched and for resuming playback of music data on the music CD placed in the CD read-out section 16, based on the information about the playback-interrupt point preserved in, for example, the HDD 21, as soon as playback of music data on the music CD in the CD read-out section 16 is demanded as a result of the source being switched.

TOC information, a recorded track number, and a playback-interrupt point will now be described. The audio controller 11 duplicates music data recorded on the music CD placed in the CD read-out section 16 onto the HDD 21. If the power is turned OFF or the music CD is ejected by the user during this duplication, i.e., if duplication onto the HDD 21 is interrupted, the audio controller 11 preserves in the HDD 21 the TOC information about the music CD, information about the duplicated tracks, and information about the playback-interrupt point such that these information items are associated with one another.

Figure 2:
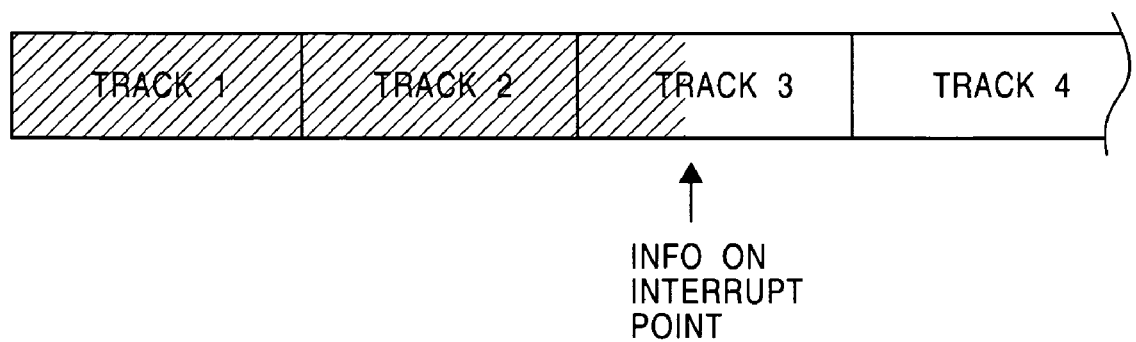
FIG. 2 is a diagram illustrating a playback-interrupt point of a music CD.

Using the recorded track number and the information about the playback-interrupt point associated with the TOC information, the audio controller 11 resumes recording of the music CD placed in the CD read-out section 16. FIG. 2 is a diagram illustrating a playback-interrupt point of a music CD. A typical music CD includes tracks, such as track 1, track 2, track 3, and so on, each containing a piece of music. The example shown in FIG. 2 shows a music CD whose music data is to be duplicated onto the HDD 21, where track 1 and track 2 have been recorded and recording was interrupted while track 3 was being played back.

FIG. 3 is a diagram illustrating a table where the TOC information is associated with a recorded track number and information about the playback-interrupt point. This table is stored in the HDD 21. As shown in FIG. 3, the TOC information includes an identification number (ID No.) "01", the number of tracks "8", a total play time "23 minutes 15 seconds", track numbers "01, 02, and so on", and play times. Furthermore, "Copying Done or Not Done" is included to indicate recorded track numbers associated with the TOC information.

The information about the playback-interrupt point associated with the TOC information is also indicated. The example shown in FIG. 3 indicates that playback of the music CD was interrupted at the point "one minute fifteen seconds" of track number "03", i.e., the third track.

Figure 4:
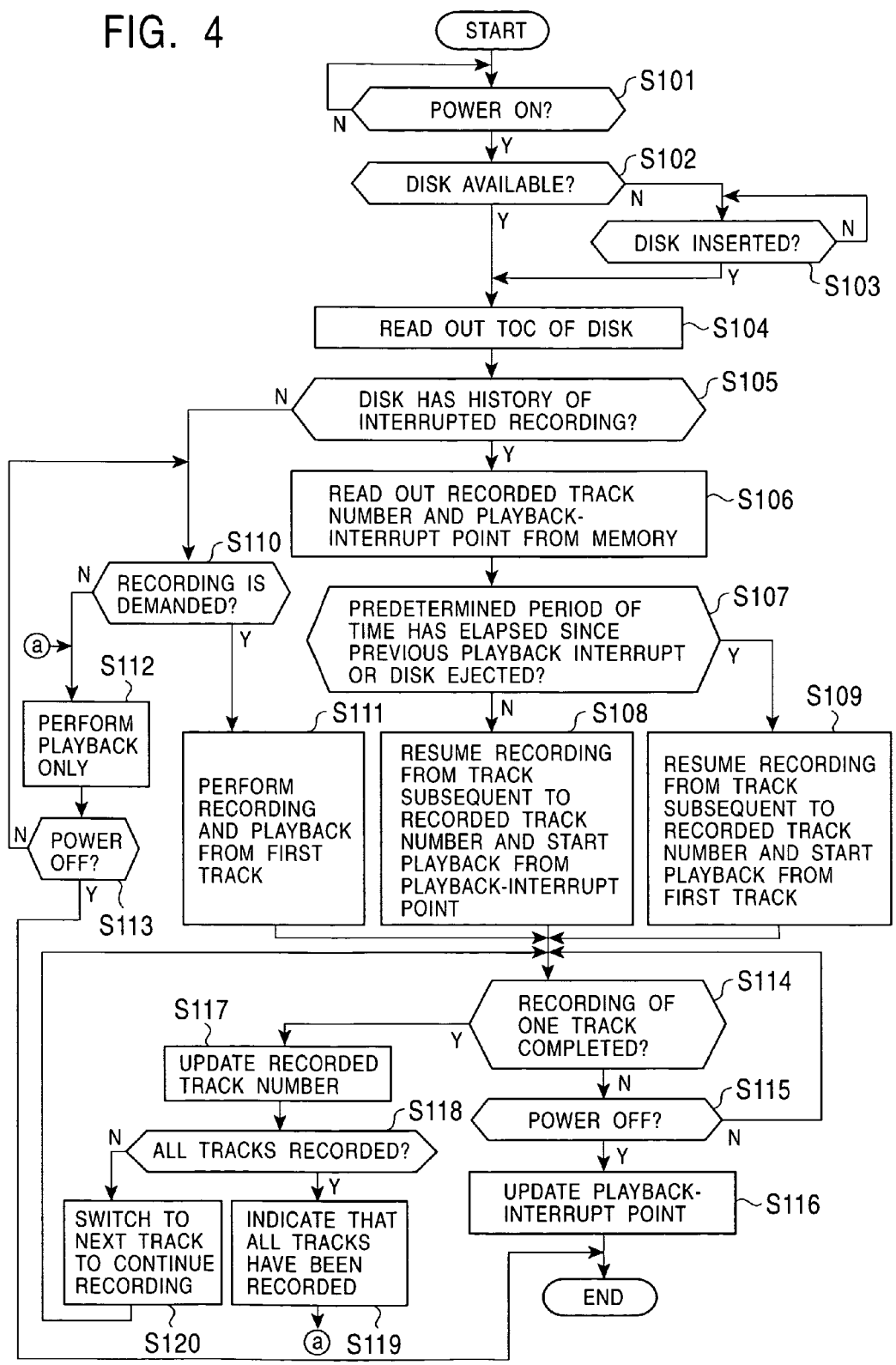
FIG. 4 is a flowchart of the operation of a recording and playback apparatus according to an embodiment of the present invention.

The operation of the recording and playback apparatus 1 according to this embodiment will now be described. FIG. 4 is a flowchart of the operation of the recording and playback apparatus 1 according to this embodiment. In act S101, the audio controller 11 determines whether the power of the recording and playback apparatus 1 is ON. If the power is ON, the flow proceeds to act S102, where the audio controller 11 determines whether or not a music CD is placed in the CD read-out section 16. If a music CD is placed in the CD read-out section 16, the flow proceeds to act S104.

If the audio controller 11 determines in act S102 that a music CD is not placed in the CD read-out section 16, the flow proceeds to act S103. In act S103, the audio controller 11 determines whether a music CD is inserted by the user. If the audio controller 11 determines that a music CD has been inserted by the user, the flow proceeds to act S104.

In act S104, the audio controller 11 reads out the TOC information from the music CD placed in the CD read-out section 16 via the source-switching section 17. Furthermore, the audio controller 11 acquires the TOC information of music data recorded in the HDD 21 and the information associated with this TOC information from the HDD21, and stores these items of information in RAM 14.

In act S105, the audio controller 11 compares the TOC information of the music CD placed in the CD read-out section 16 acquired in act S104 with the TOC information of the music data recorded in the HDD 21 to determine whether or not the music CD placed in the CD read-out section 16 has a history of interrupted recording onto the HDD 21.

Figure 6:
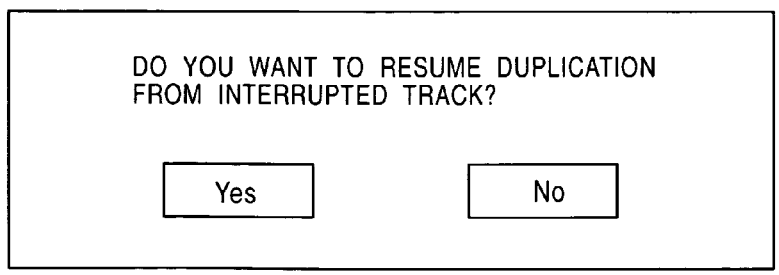
FIG. 6 shows an example of dialog for allowing a user to select whether or not duplication should be resumed from the track subsequent to the interrupted track.

If the audio controller 11 determines in act S105 that the music CD placed in the CD read-out section 16 has a history of interrupted recording onto the HDD 21, the flow proceeds to act S106. In this case, the audio controller 11 may show dialog, as shown in FIG. 6, for allowing the user to select whether or not duplication should be resumed from the interrupted track.

On the other hand, if the audio controller 11 determines in act S105 that the music CD placed in the CD read-out section 16 does not have a history of interrupted recording onto the HDD 21, the audio controller 11 determines in act S110 whether or not the user has performed an operation for demanding recording.

If the audio controller 11 determines in act S110 that the user has demanded recording, in act S111 the audio controller 11 carries out recording of the music CD placed in the CD read-out section 16 onto the HDD 21 starting with the first track, and also starts playback of music data on the music CD from the first track.

On the other hand, if the audio controller 11 determines in act S110 that the user has not demanded recording, the flow proceeds to act S112, where the audio controller 11 only plays back the music CD placed in the CD read-out section 16. If the audio controller 11 determines in act S113 that the power is ON, the flow returns to act S110. Otherwise, the audio controller 11 ends the processing.

Referring back to act S106, the audio controller 11 reads out the recorded track number associated with the TOC information and the information about the playback-interrupt point from the RAM 14. In act S107, the audio controller 11 determines whether a predetermined period of time has elapsed since the last interruption of the playback of the music CD placed in the CD read-out section 16 or whether this music CD has ever been ejected.

If the audio controller 11 determines in act S107 that a predetermined period of time has elapsed since the last interruption of the playback of the music CD placed in the CD read-out section 16 or that this music CD has been ejected, the flow proceeds to act S109.

In act S109, the audio controller 11 resumes recording from the track subsequent to the recorded track number, and plays back the music CD placed in the CD read-out section 16 from the first track. Thus, not only is the user allowed to listen from the first track, but recording is resumed from the interrupted track.

On the other hand, if the audio controller 11 determines in act S107 that a predetermined period of time has not elapsed since the last interruption of the playback of the music CD placed in the CD read-out section 16 and that this music CD has never been ejected, the audio controller 11, in act S108, resumes recording from the track subsequent to the recorded track number, and also resumes the playback of the music CD placed in the CD read-out section 16 from the playback-interrupt point.

In short, recording is resumed from the previous recording-interrupt point, and playback is resumed from the previous playback-interrupt point. As a result, in the example shown in FIG. 3, playback is started from the point "one minute fifteen seconds" into the third track.

In act S114, if the audio controller 11 determines that the recording of one track is completed, the audio controller 11 updates the recorded track number stored in the HDD 21 in act S117. In short, in the example shown in FIG. 3, the item "Copying Done or Not Done" for track number "03" is updated from "Not Done" to "Done".

In act S118, the audio controller 11 determines whether or not all tracks on the music CD placed in the CD read-out section 16 have been recorded onto the HDD 21. If the audio controller 11 determines that all tracks on the music CD placed in the CD read-out section 16 have been recorded onto the HDD 21, the audio controller 11 indicates in act S119 that all tracks have been recorded on the display apparatus 24, and then the flow returns to act S112.

If the audio controller 11 determines in act S118 that not all tracks on the music CD placed in the CD read-out section 16 have been recorded onto the HDD 21, the audio controller 11 switches to the next track in act S120 and continues recording onto the HDD 21. Then, the flow returns to act S114.

On the other hand, if the audio controller 11 determines in act S114 that one track has not yet been recorded, the audio controller 11 determines in act S115 whether or not the power is OFF. If the audio controller 11 determines that the power is OFF, the audio controller 11 updates the information about the playback-interrupt point stored in the HDD 21 in act S116, and then ends the processing.

According to the operation of the recording and playback apparatus 1 shown in FIG. 4, when a music CD which has a history of interrupted duplication is placed in the CD read-out section 16, duplication is resumed onto the HDD 21 based on the TOC information and the information about duplicated tracks preserved in the HDD 21. Because of this, even if duplication is interrupted prematurely, the subsequent duplication can be resumed from the recording-interrupt point. As a result, the operation for duplicating only the tracks that were not duplicated in the previous duplication can be carried out easily. Furthermore, when recording is to be resumed, playback is also started from the track with which recording is started if the music CD has not been ejected, whereas playback is started from the first track if the music CD has been ejected. Because of this, natural playback operation can be assumed by the user.

Figure 5:
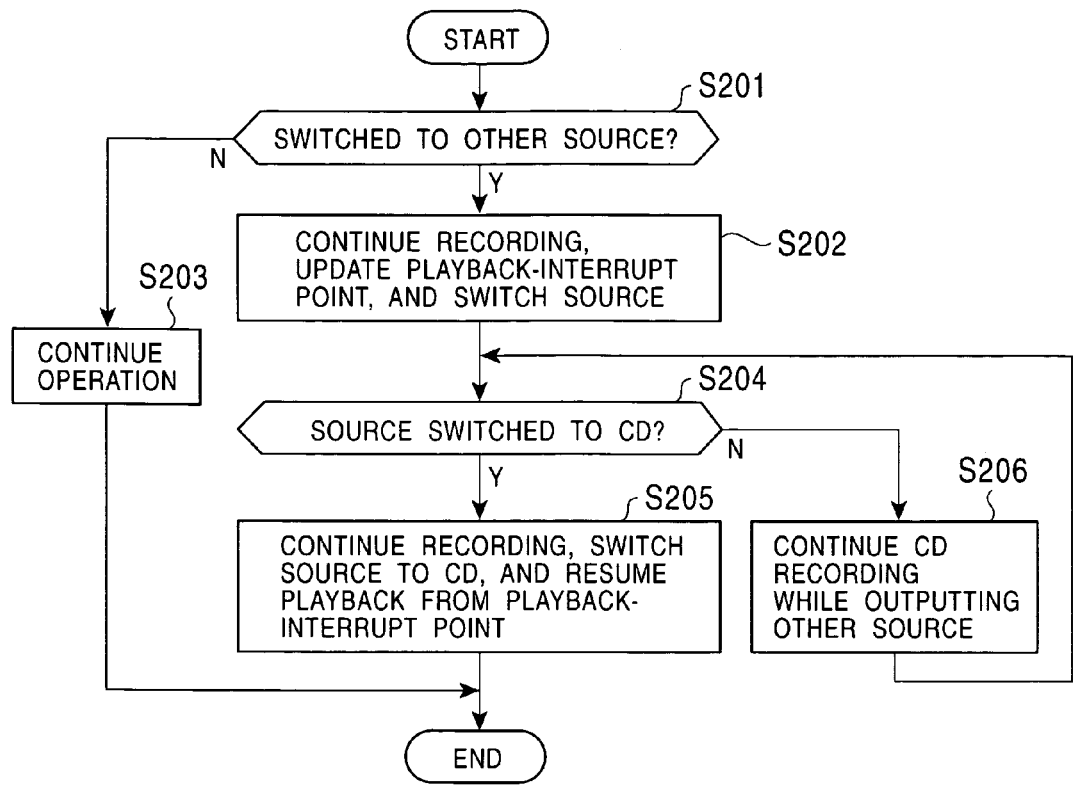
FIG. 5 is a flowchart of another operation of a recording and playback apparatus according to an embodiment of the present invention.

Another example of the operation of the recording and playback apparatus 1 according to this embodiment will now be described. FIG. 5 is a flowchart of another operation of the recording and playback apparatus 1 according to this embodiment. In act S201, the audio controller 11 determines whether or not the user has switched the current source to another source. If the audio controller 11 determines in act S201 that the user has switched the current source to another source, the flow proceeds to act S202, where the audio controller 11 continues recording onto the HDD 21.

Furthermore, the audio controller 11 records the TOC information of the music CD placed in the CD read-out section 16 and information about the playback-interrupt point associated with this TOC information in the RAM 14 to update these items of information, and also accesses the source-switching section 17 to switch the current source.

On the other hand, if the audio controller 11 determines in act S201 that switching to another source has not been carried out, the audio controller 11 continues recording of the music data stored in the music CD placed in the CD read-out section 16 onto the HDD 21 in act S203.

In act 204, the audio controller 11 determines whether or not the user has switched the source to the CD. If switching of the source to the CD has been carried out, in act S205 the audio controller 11 continues recording onto the HDD 21 and also switches the source to the CD via the source-switching section 17.

Furthermore, the audio controller 11 acquires the TOC information, the recorded track number associated with the TOC information, and the information about the playback-interrupt point from the RAM 14, resumes playback from the playback-interrupt point, and ends the processing. If the audio controller 11 determines in act S204 that switching of the source to the CD has not been carried out, the audio controller 11 continues, in act S206, the recording of the music CD placed in the CD read-out section 16 while outputting from the current source.

According to the operation of the recording and playback apparatus 1 described with reference to FIG. 5, even if playback is interrupted as the current source is switched to another source, duplication onto the storage means is continued, and when an instruction is given that the music CD placed in the CD read-out section 16 is to be played back by switching back to the CD source, playback of music data is resumed based on the information about the playback-interrupt point preserved in, for example, the HDD 21. This enables another source to be selected, while still ensuring that duplication onto the HDD 21 is continued.

The description of one embodiment according to the present invention has been given. The present invention, however, is not limited to the above-described embodiment but various modifications are conceivable within the scope of the spirit of the present invention. For example, the recording medium is not limited to a music CD as described in the embodiment, but another recording medium, such as a DVD, is also applicable.

What is claimed is:

1. A recording and playback apparatus comprising:
   a duplicating section for duplicating music data from a recording medium in a predetermined read-out section onto a predetermined storage section;
   a preserving section which, if duplication by the duplicating section is interrupted, preserves identification information identifying the recording medium and duplicated-music-data information identifying duplicated music data such that the identification information is associated with the duplicated-music-data information; and
   a playback section for playing back music data stored in the storage section,
   wherein, when a recording medium having a history of interrupted duplication is placed in the read-out section, the duplicating section resumes duplication onto the storage section based on the identification information and the duplicated-music-data information preserved in the preserving section; and
   wherein the playback section resumes playback of music data from interrupted music if the duplicating section has resumed duplication within a predetermined period of time, or from the first piece of music if the duplicating section has resumed duplication after a predetermined period of time or if the recording medium in the read-out section has been ejected and has been placed again in the read-out section.

2. The recording and playback apparatus according to claim 1, further comprising a dialog display section for displaying dialog which enables a user to select whether or not duplication onto the storage section is to be resumed when a recording medium having a history of interrupted duplication is placed in the read-out section.

3. The recording and playback apparatus according to claim 2, wherein the duplicating section duplicates music data from the recording medium onto the storage section by reading the music data at a high rate, and the playback section plays back the music data stored in the storage section at a standard rate.

4. The recording and playback apparatus according to claim 3, wherein the recording medium is an optical disk on which music is recorded and the storage section is a hard disk.

5. The recording and playback apparatus according to claim 1, wherein the recording medium is one of a CD and a DVD.

6. A recording and playback apparatus comprising:
   a duplicating section for duplicating music data from a recording medium in a predetermined read-out section onto a predetermined storage section;

a playback section for playing back music data recorded on the recording medium; and a preserving section which, when playback by the playback section is interrupted as a result of a source being switched, preserves playback-interrupt-point information identifying a point at which the playback is interrupted, wherein the duplicating section continues duplication onto the storage section even though playback is interrupted as a result of the source being switched, and when an instruction is given that music data on the recording medium in the read-out section should be played back as a result of a source being switched, the playback section resumes playback of music data on the recording medium based on the playback-interrupt-point information preserved in the preserving section.

7. The recording and playback apparatus according to claim 6, wherein the duplicating section duplicates music data from the recording medium onto the storage section by reading the music data at a high rate, and the playback section plays back the music data stored in the storage section at a standard rate.

8. The recording and playback apparatus according to claim 7, wherein the recording medium is an optical disk on which music is recorded and the storage section is a hard disk.

9. A music-data recording and playback method comprising:

a duplicating act of duplicating music data from a recording medium in a predetermined read-out section onto a predetermined storage section;

a preserving act of enabling a preserving section to preserve identification information identifying the recording medium and duplicated-music-data information identifying duplicated music data such that the identification information is associated with the duplicated-music-data information, when duplication in the duplicating act is interrupted; and a playback act of playing back music data stored in the storage section, wherein, in the duplicating act, when a recording medium having a history of interrupted duplication is placed in the read-out section, duplication onto the storage section is resumed based on the identification information and the duplicated-music-data information preserved in the preserving section; and wherein, in the playback act, playback of music data is resumed from interrupted music if duplication is resumed in the duplication act within a predetermined period of time, or from the first piece of music if duplication is resumed in the duplicating act after a predetermined period of time or if the recording medium in the read-out section has been ejected and has been placed again in the read-out section.

10. The music-data recording and playback method according to claim 9, further comprising a dialog display act of displaying dialog which enables a user to select whether or not duplication onto the storage section is to be resumed when a recording medium having a history of interrupted duplication is placed in the read-out section.

11. A music-data recording and playback method comprising:

a duplicating act of duplicating music data from a recording medium in a predetermined read-out section onto a predetermined storage section;

a playback act of playing back music data recorded on the recording medium; and a preserving act of enabling a preserving section to preserve playback-interrupt-point information identifying a point at which playback is interrupted, when playback in the playback act is interrupted as a result of a source being switched, wherein, in the duplicating act, duplication onto the storage section is continued even though playback is interrupted as a result of the source being switched, and when an instruction is given that music data on the recording medium in the read-out section should be played back as a result of a source being switched, playback of music data on the recording medium is resumed in the playback act based on the playback-interrupt-point information preserved in the preserving section.

12. A computer-readable medium encoded with a music-data recording and playback program comprising:

duplicating means for duplicating music data from a recording medium in a predetermined read-out section onto a predetermined storage section;

means for enabling a preserving section to preserve identification information identifying the recording medium and duplicated-music-data information identifying duplicated music data such that the identification information is associated with the duplicated-music-data information, when duplication by the duplicating means is interrupted;

playback means for playing back music data stored in the storage section; and duplication-resuming means for resuming duplication onto the storage section based on the identification information and the duplicated-music-data information preserved in the preserving section, when a recording medium having a history of interrupted duplication is placed in the read-out section;

wherein the playback means resumes playback of music data from interrupted music if the duplication-resuming means has resumed duplication within a predetermined period of time, or from the first piece of music if the duplication-resuming means has resumed duplication after a predetermined period of time or if the recording medium in the read-out section has been ejected and has been placed again in the read-out section.

13. The computer-readable medium encoded with a music-data recording and playback program according to claim 12, further comprising dialog display means for displaying dialog which enables a user to select whether or not duplication onto the storage section is to be resumed when a recording medium having a history of interrupted duplication is placed in the read-out section.

* * * * *